(No Model.)
P. KRUMSCHEID.
FABRIC FOR TIRES.
No. 573,008. Patented Dec. 15, 1896.
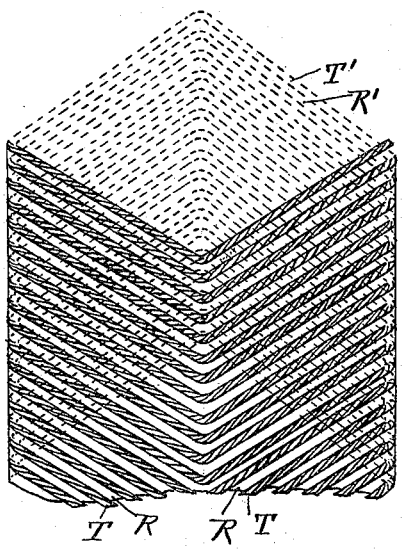
WITNESSES
Frank G. Parker.
H. H. Meek.
INVENTOR
Peter Krumscheid

UNITED STATES PATENT OFFICE.

PETER KRUMSCHEID, OF BOSTON, MASSACHUSETTS.

FABRIC FOR TIRES.

SPECIFICATION forming part of Letters Patent No. 573,008, dated December 15, 1896.

Application filed May 10, 1895. Serial No. 548,825. (No model.)

*To all whom it may concern:*

Be it known that I, PETER KRUMSCHEID, of Boston, in the county of Suffolk and State of Massachusetts, have invented a new and useful Improvement in Fabrics for Tires, &c., of which the following, taken in connection with the accompanying drawing, is a specification.

My invention relates to fabrics; and it consists in the peculiar method of arranging the threads and elastic strips of which the fabric is composed, and may be best understood by reference to the drawing and specification.

The object of my invention is to construct a fabric in which the lines of tension have different degrees of elasticity, so that it may adapt itself to the peculiar requirements of the article to which it is applied. This object I attain by means of the arrangements shown in the accompanying drawing.

The drawing indicates but one system of arranging the crossings of the rubber strips and threads; but I do not wish to confine myself to any particular lines or angles.

The fabric, as illustrated in the drawing, consists in, first, a layer of rubber strips R' R', alternating with threads T' T', the rubber strips and the threads in this case being indicated by dotted lines. Upon this layer a second layer is laid, the rubber strips R R and the threads T T of which are indicated by full lines. The two layers are united by the adhesive qualities of the rubber strips, or if desirable or necessary a thin rubber cement may be used, or the surfaces may have an application of some rubber solvent and then pressed together.

By arranging the strips and threads as shown in the drawing the line of greatest elasticity will be found in the center of the fabric, while the edges of the fabric are nearly inelastic, on account of the position of the fibrous threads which run nearly in line with the edge of the fabric.

The arrangement of the threads and rubber strips of one layer in relation to the threads and rubber strips of the other layer may be varied at will without departing from the spirit of my invention.

I claim—

A semielastic unwoven tire made by laying side by side alternately a thread of fiber and a strip of rubber then upon this structure laying also side by side alternately a thread of fiber and a strip of rubber each thread and strip of the second structure crossing the threads and strips of the first at an angle, the two structures being cemented together all substantially as and for the purpose set forth.

In testimony whereof I have signed my name to this specification, in the presence of two subscribing witnesses, on this 3d day of May, A. D. 1895.

PETER KRUMSCHEID.

Witnesses:
WM. P. PERRY,
WM. H. PARRY.